(12) United States Patent
Bauer et al.

(10) Patent No.: US 7,011,786 B2
(45) Date of Patent: *Mar. 14, 2006

(54) PROCESS FOR PRODUCING SHAPED BODIES COMPRISING FIBER-REINFORCED CERAMIC MATERIALS

(75) Inventors: Moritz Bauer, Augsburg (DE); Michael Heine, Allmannshofen (DE); Andreas Kienzle, Thierhaupten (DE); Ronald Huener, Baar (DE); Rainer Zimmermann-Chopin, Ellgau (DE); Andreas Rahn, Wertingen (DE)

(73) Assignee: SGL Carbon AG, (DE)

( * ) Notice: Subject to any disclaimer, the term of this patent is extended or adjusted under 35 U.S.C. 154(b) by 315 days.

This patent is subject to a terminal disclaimer.

(21) Appl. No.: 10/328,659

(22) Filed: Dec. 23, 2002

(65) Prior Publication Data

US 2005/0179152 A1    Aug. 18, 2005

(30) Foreign Application Priority Data

Dec. 31, 2001  (DE)  ............................... 101 64 231

(51) Int. Cl.
   *B29C 35/08*  (2006.01)
   *B29C 59/00*  (2006.01)
   *B29C 67/00*  (2006.01)
   *C01B 31/00*  (2006.01)
   *D01F 9/12*   (2006.01)

(52) U.S. Cl. ................ 264/405; 264/29.1; 264/29.2; 264/29.7; 264/122; 264/125

(58) Field of Classification Search ........ 264/405–496, 264/29.1, 29.2, 29.7, 122, 125
   See application file for complete search history.

(56) References Cited

U.S. PATENT DOCUMENTS

| 2,965,931 A | 12/1960 | Alden et al. |
| 6,231,791 B1 | 5/2001 | Heine et al. |
| 6,261,981 B1 | 7/2001 | Dietrich et al. |
| 6,699,427 B1 * | 3/2004 | Huang et al. ............... 264/434 |

FOREIGN PATENT DOCUMENTS

| DE | 197 10 105 A1 | 9/1998 |
| DE | 197 11 829 C1 | 10/1998 |
| DE | 198 56 721 A1 | 6/2000 |
| FR | 2 637 534 | 4/1990 |
| JP | 04 280873 A | 10/1992 |
| JP | 04280873 | 10/1992 |
| JP | 198 56 721 | 6/2000 |

\* cited by examiner

*Primary Examiner*—Stephen J. Lechert, Jr.
(74) *Attorney, Agent, or Firm*—Connolly Bove Lodge & Hutz LLP

(57) ABSTRACT

Process for producing shaped bodies comprising fiber-reinforced ceramic materials, where a green body is produced in a first step by introducing a press moulding composition into a mold, where the press moulding composition comprises carbon fibers and/or carbon filaments and pitch and/or resins which, when treated thermally and with the exclusion of oxidizing agents, form carbon-containing residues, the green body is cured in a second step by heating to a temperature of from 120° C. to 280° C. under pressure, the cured green body, also referred to as intermediate body, is carbonized in a third step by heating in a nonoxidizing atmosphere to a temperature of from about 750° C. to about 1100° C. to form a C/C body, wherein heating in the first, second and/or third step is at least partly effected by an electric current being passed through the pressable composition, the green body and/or the cured green body, shaped bodies produced according to this process and their use as brake disks, clutch disks and friction disks

5 Claims, No Drawings

PROCESS FOR PRODUCING SHAPED BODIES COMPRISING FIBER-REINFORCED CERAMIC MATERIALS

FIELD OF THE INVENTION

The present invention relates to a process for producing shaped bodies comprising fiber-reinforced ceramic materials. In particular, the invention relates to a process for producing a porous fiber-reinforced carbon-containing shaped body which is close to the final shape (near net shape), in particular a fiber-reinforced C/C body ("CFC" or "CFRC"=carbon fiber reinforced carbon) which is shaped from binder-containing fiber compositions by means of a press moulding procedure and is converted into C/C in a subsequent thermal treatment, and also, if appropriate, the post-densification of a porous fiber-reinforced carbon-containing shaped body to form a ceramic matrix, in particular by infiltration of the C/C body with a liquid metal, if appropriate with subsequent heat treatment, so that the matrix then comprises metals and metal carbides formed by reaction with carbon, possibly together with residual unreacted carbon.

The process of the invention relates particularly to the production of ceramic composite materials which are reinforced with carbon fibers and, if desired, have recesses and hollow spaces and which are converted by infiltration with a silicon melt so as to react with at least part of the carbon to form silicon carbide into composite materials which are reinforced with carbon fibers and have an SiC-containing or carbon-, SiC— and Si— containing matrix (C/SiC or C/C—SiC materials). These composite materials are employed, in particular, in brake disks, clutch disks and friction disks and also as high temperature-resistant construction materials.

BACKGROUND OF THE INVENTION

Materials used for automotive brake disks are nowadays predominantly made of steel or cast iron, and in aircraft applications of carbon materials reinforced with carbon fibers (C/C). The properties required of the disk materials are high mechanical stability, heat resistance, hardness and wear resistance in the friction pair of a brake. The use temperature of cast iron brake disks used hitherto is limited by the melting point of the material. The temperature at which mechanical failure occurs is, depending on the stress, significantly below the melting point. Furthermore, there is a risk of cracking of the disks due to transformation of the metallic microstructure on heating. The use of fiber-reinforced ceramics as a material for brake disk applications has been found to be a solution to these problems. Materials based on silicon carbide reinforced with carbon fibers (C/SiC) in particular have been found useful for this application. The advantages of this material are their lower density (reduced weight for a given volume), their high hardness and heat resistance up to about 1400° C. and, not least, their extremely high wear resistance. The significantly reduced density of brake disks made of these C/SiC materials improves comfort and safety by reduction of the unsprung masses in motor vehicles, and also economics in aircraft applications. The high hardness and wear resistance of C/SiC components allows to achieve far longer operating lives compared to previously customary materials based on C/C or metal.

Processes for producing C/SiC components have been known from, for example, DE-A 198 56 721, DE-C 197 11 829 and DE-A 197 10 105 and comprise, inter alia, the following steps:

preparation of a pressable mixture or formable composition comprising, firstly, carbon-containing fibers or fiber bundles which may be coated and, secondly, fillers and/or binders such as resins and/or pitch, shaping of the mixture under pressure and at elevated temperature and carbonization of the carbon-containing fillers and binders to produce a shaped body, in particular a shaped body comprising carbon reinforced with carbon fibers (C/C) and, if appropriate, subsequent graphitization, infiltration of at least an outer layer of the shaped body with a silicon melt and at least partial reaction with the carbon in the shaped body to produce SiC, thus forming a shaped body which comprises, at least in the outer layer, a composite ceramic composed of carbon-containing fibers embedded in a matrix comprising predominantly SiC, Si and C (hereinafter referred to as C/SiC).

In the following, the term C/SiC materials also encompasses the material variant in which, as described above, only an outer layer is silicized.

The term "formable fiber composition" encompasses both the fiber-containing press moulding compositions which typically comprise short fibers or short fiber bundles and also fiber mats, woven fabrics or nonwovens which can be processed, for example, by the prepreg technique. The latter can also, in particular, be shaped with very little or no application of pressure.

Customary production processes also include those in which the C/C body is post-densified via the liquid or gas phase with carbon precursors, namely substances which form carbon on heating in the absence of oxidizing media, or by means of carbon, or the matrix comprising predominantly SiC, Si and C is produced by gas-phase infiltration (CVD, chemical vapor deposition, or CVI, chemical vapor infiltration) or by pyrolysis of Si— containing preceramic polymers.

During pressing of the green body, the heat necessary for thermal curing of the binder is generally introduced from the outside into the moulding composition or the workpiece by heating the press or at least the punch of the press. As a result, the outer region of the workpiece is heated to a temperature higher than that of the inner region, so that heat can be transported into the interior of the workpiece by means of the temperature gradient. This nonuniform heating leads to nonuniform curing and can lead to stresses in the workpiece; the chemical and physical processes occurring in the outer zone can even lead to liberation of gases, for example, during heating and the accompanying chemical reactions which cannot escape through the outer zone and may lead to rupture of the workpiece or to formation of cracks in the workpiece. In addition, the total time of the pressing operation, viz. the pressing cycle time, is undesirably high, since all press components which are in contact with the press moulding composition, which sometimes have a considerable heat capacity, have to be heated and cooled again. This causes a high energy consumption.

It is therefore an object of the invention to provide a process, in particular a process having short cycle times and a low energy consumption, which is suitable for producing fiber-reinforced carbon-containing green bodies or intermediate bodies which may, if desired, subsequently be converted into shaped bodies comprising fiber-reinforced carbide ceramic by infiltration with liquid metals, in particular liquid silicon, and subsequent reaction.

SUMMARY OF THE INVENTION

According to the invention, this object is achieved by using press moulding compositions which have an electrical conductivity suitable for generating, prior to, during or after the pressing operation, at least part of the thermal energy required for curing as Joule heat by passing electic current through them.

The invention accordingly provides a process for producing shaped bodies comprising fiber-reinforced ceramic materials, where a press moulding composition is introduced in a first step into a pressing mold, wherein the press moulding composition comprises carbon fibers and/or carbon fiber bundles and/or carbon filaments, which have preferably been coated with carbon or carbon-containing compounds, and pitch and/or resins which are thermally curable and capable of being carbonized, the press moulding composition is cured by heating to a temperature of from 120° C. to 280° C. under pressure to produce a green body in a second step, the green body is carbonized and/or graphitized in a third step by heating in a nonoxidizing atmosphere to a temperature of from about 750° C. to about 2400° C. to form a C/C body, and, if desired, the C/C body is infiltrated with a liquid metal with retention of its shape in a fourth step, with at least partial reaction of the carbon present in the matrix of the C/C body with the metal to form carbides, wherein heating in the first or second step is at least partly effected by an electric current being passed through the press moulding composition or the green body. Electrically conductive components present in the press moulding composition or green body are essentially carbon fibers, carbon fiber bundles and carbon-coated fibers.

Sufficient heating by means of the flow of electric current during pressing requires a balanced ratio between electrical resistance and applied voltage. Preference is given to the low voltage range, typically using voltages below 250 V.

DETAILED DESCRIPTION OF THE PREFERRED EMBODIMENTS

The press moulding composition, the green body and/or the cured green body preferably have an electrical conductivity of at least 0.1 S/m, particularly in the range from 0.1 S/m to 100 S/m. The conductivity is preferably in the range from 1 to 50 S/m and particularly preferably in the range from 2 to 10 S/m.

The conductivity of the press moulding composition during pressing and the green body formed during the pressing operation is preferably selected so that with the preferred voltages of up to 150 V and currents of less than 500 A, the preferred temperatures of from about 100 to 280° C. can be chosen.

In a preferred embodiment, carbon fibers are used in the form of coated short fiber bundles in the press moulding composition. Particular preference is here given to fibers or fiber bundles which are coated with graphitized carbon and have mean lengths of less than 50 mm.

As thermally curable binders, use is made of pitches such as coaltar pitch or petroleum pitch and/or resins such as phenolic resins, epoxy resins, polyimides, filler-containing mixtures with furfuryl alcohol or furan resins. The press moulding compositions are cured under the action of heat, preferably at temperatures of from 100 to 280° C.

Particularly when using long fiber-reinforced or fabric-reinforced press moulding compositions, thermal curing can also be carried with little or no application of pressure. This is typically the case for shaped bodies produced by the prepreg technique or lamination. A press is not need in this case.

Carbonization or graphitization of the green body gives a porous C/C body which can be shaped or fabricated further. It can be machined mechanically, e.g. by drilling, turning or milling, or can in turn be assembled or adhesively bonded to form more complex structures.

In further steps, the porous C/C body can also be further impregnated with thermally curable and carbonizable binders or polymers and carbonized again in order to obtain a material having a higher density and a higher carbon content.

In a preferred embodiment of the process of the invention, the carbon of the C/C body is converted in a fourth step at least partly into the corresponding carbides by infiltration with molten metals where the term "metals" also comprises silicon and, if appropriate, subsequent heat treatment. Preference is given to infiltration with molten silicon, in which case at least part of the carbon (preferably the carbon in the matrix) reacts to form silicon carbide; the matrix then comprises SiC, unreacted carbon and unreacted silicon. For this purpose, the C/C body is typically covered with silicon powder and then heated under reduced pressure to temperatures of from about 1500 to about 1800° C. Depending on the intended use, it is not absolutely necessary to convert all of the C/C body into C/SiC, but it is usual for at least the outer layer to be converted into C/SiC. Although silicon melt infiltration is the preferred process, the C/C body can also be post-densified by means of other customary processes to form the matrices customary in composite materials technology. In particular, the liquid siliconisation process can also be carried out using silicon alloys which may further comprise, inter alia, metals such as Cr, Fe, Co, Ni, Ti and/or Mo.

The process described is preferably used for producing brake disks or clutch disks.

For this purpose, a press mold which has the desired shape is filled with the press moulding composition and the punch and bottom of the press are brought together, with the electric current being introduced into the press moulding composition via the top and bottom surfaces of the press mold. Since the electrical resistance of the composition varies with, in particular, the density during the pressing operation, the applied voltage or the electric current likewise have to be varied over the total pressing operation. In contrast to heating by heat conduction from the outside, this leads to uniform heating over the cross section and over the height of the green body or workpiece formed.

The cured green body is then further processed as described above, i.e. carbonized and/or graphitized and subsequently converted at least partly into the corresponding carbides by melt infiltration with liquid metals, preferably liquid silicon.

In the green state or in the carbonized state, the necessary holes for fastening the brake or clutch disks and, if desired, hollow spaces and recesses for ventilation can be introduced into the workpieces by customary mechanical machining methods such as drilling, turning and milling.

What is claimed is:

1. A process for producing porous fiber-reinforced shaped bodies, where
- a press moulding composition is introduced into a pressing mold, where the press moulding composition comprises carbon fibers and/or carbon fiber bundles and/or carbon filaments,
- and pitches and/or resins which are thermally curable and capable of being carbonized in a first step,
- the press moulding composition is cured by heating to a temperature of from 120° C. to 280° C. under pressure, in a second step to form a green body,
- the green body is carbonized and/or graphitized in a third step by heating in a nonoxidizing atmosphere to a temperature of from about 750° C. to about 2400° C. to give a C/C body, wherein heating in the second and/or third step is at least partly effected by an electric current being passed through the press moulding composition and/or the cured green body, during pressing.

2. The process as claimed in claim 1, wherein, subsequent to the third step,
- the C/C body is infiltrated with a liquid metal with retention of its shape in a fourth step, with at least partial reaction of the carbon present in the matrix of the C/C body with the metal to form carbides.

3. The process as claimed in claim 1, wherein the electrical conductivity of the press moulding composition prior to or during the pressing operation is at least 0.1 S/m.

4. The process as claimed in claim 1, wherein the electrical conductivity of the green body is at least 0.1 S/m.

5. The process as claimed in claim 1, wherein the pressable composition is heated by passing electric current through it via the top and bottom surfaces of a pressing mold.

* * * * *